United States Patent
Chevalier et al.

(10) Patent No.: US 7,091,906 B2
(45) Date of Patent: Aug. 15, 2006

(54) METHOD AND DEVICE FOR THE CALIBRATION-EQUALIZATION OF A RECEPTION SYSTEM

(75) Inventors: Pascal Chevalier, Courbevoie (FR); Christophe Donnet, Issy-les-Moulineaux (FR)

(73) Assignee: Thales, Neuilly S/Seine (FR)

( * ) Notice: Subject to any disclaimer, the term of this patent is extended or adjusted under 35 U.S.C. 154(b) by 374 days.

(21) Appl. No.: 10/669,691

(22) Filed: Sep. 25, 2003

(65) Prior Publication Data

US 2004/0108953 A1    Jun. 10, 2004

(30) Foreign Application Priority Data

Sep. 27, 2002    (FR) ................... 02 12010

(51) Int. Cl.
*G01S 7/40*   (2006.01)
*H01Q 3/22*   (2006.01)

(52) U.S. Cl. .................. 342/368; 342/174

(58) Field of Classification Search ............... 342/165, 342/174, 368, 369, 372
See application file for complete search history.

(56) References Cited

U.S. PATENT DOCUMENTS 5,477,229 A * 12/1995 Caille et al. ............... 342/360

| | | |
|---|---|---|
| 6,205,341 B1 | 3/2001 | Monot et al. |
| 6,735,422 B1 * | 5/2004 | Baldwin et al. ......... 455/232.1 |
| 2002/0057660 A1 | 5/2002 | Park et al. |
| 2003/0223480 A1 * | 12/2003 | Cafarella ................... 375/219 |
| 2005/0140546 A1 * | 6/2005 | Park et al. .................. 342/368 |

FOREIGN PATENT DOCUMENTS

EP    1014485 A1    5/2002

* cited by examiner

*Primary Examiner*—Dao Phan
(74) *Attorney, Agent, or Firm*—Lowe Hauptman & Berner, LLP

(57) ABSTRACT

A device and method for the calibration and equalization of reception chains of an antenna processing system comprises several RF chains, each associated with a radiating element, a set of sensors Ci formed out of the outputs of the preceding RF chains, a channel for the injection of a calibration signal, means to couple the calibration signal to the sensor signals and several reception-digitization chains. The device comprises at least one processor adapted to managing all the devices; a means used to adjust the value of the gain of an RF chain to a minimum value Gmin; a means for deflecting the sensors, adapted to minimizing their directivity toward the interference sources; a means adapted to adjusting the level of the injected calibration signal ST relative to the signal of the sensors, an RF chain having a gain adjusted to a minimum value Gmin.

14 Claims, 8 Drawing Sheets

METHOD AND DEVICE FOR THE CALIBRATION-EQUALIZATION OF A RECEPTION SYSTEM

BACKGROUND OF THE INVENTION

1. Field of the Invention

The present invention relates to a method and device for the calibration and equalization of the reception chains of an antenna processing system on board a satellite for example.

It can be used in a system of antenna processing on board a geostationary satellite for the calibration and equalization of reception chains. It is also used to verify the efficient functioning of these operations of calibration and equalization, which subsequently make it possible to diagnose malfunctions in the reception channels. The entire system can also be implemented from the ground, in order to locate and reject disturbances.

The invention can be applied for example in the field of space telecommunications.

FIG. 1 shows an exemplary goniometry or anti-interference system on board a satellite. It consists of a network of Q elementary sensors $C_1, \ldots C_Q$, a set of active RF chains placed downstream from the sensors, possibly a device 3 for the formation of sub-arrays whose function is to reduce the number of chains to be digitized, a set 4 of reception chains integrating for example the digitization of the signals and a digitized data-processing device 5, distributed between onboard processing 5b and ground processing 5s.

The processing algorithms used are generally based on the exploitation of the spatial consistency of the source between the different sensors of the network. This spatial consistency is also the basis of the techniques used for the rejection of interference sources by spatial filtering of the observations. This spatial consistency must be maintained at output of the reception and digitization chains to ensure the efficient functioning of the system.

In any operational system, the reception chains located downstream from the different sensors are rarely identical. To preserve the spatial consistency of a source it is necessary, at output of the chains, to provide precompensation for the differential responses of the reception chains in phase, amplitude and group time. This must be done throughout the reception band. FIG. 2 summarizes the steps used to obtain this precompensation. It is done by the filtering ($H_k(z)$ filter) of the output of the reception chains and the associated operation is called chain equalization.

The operation of equalization is renewed as frequently as the drifts introduced at the reception chains by the parameters of influence go beyond a critical threshold. It subsequently becomes necessary to update the compensations, namely the equalization filters $H_k(z)$. The parameters of influence identified are, for example, temperature, the ageing of the components, radiation and the adjustment of the gain of the reception chains.

Various methods described for the equalization of the reception chains necessitate, explicitly or implicitly, the learning of the inter-chain differential transfer functions $T_k(f)$. This learning function is called calibration from which the equalization is deduced.

2. Description of the Prior Art

The prior art describes various techniques of calibration-equalization which may be gathered under two groups. These two groups can be differentiated especially by the capacity to adapt or not adapt to the presence of sensor observations during the calibration and equalization phase. Techniques that adapt to the presence of the observations have a low-power calibration signal added to them. However, for techniques that do not adapt to the presence of the observations, the calibration signal is injected in place of the observations.

For the group that does not adapt to the presence of the observed signals, two further sub-groups of processing are distinguished. The processing operations of the first group implement the calibration and equalization in an uncoupled way while the processing operations of the second group couple the calibration and equalization.

The second approach uses calibration and equalization in a coupled way, in seeking to obtain a situation where the outputs of the equalized chains show the greatest possible resemblance to the outputs of a chain known as a reference chain, using a criterion of minimization of the mean standard deviation for example.

The uncoupled approach implements calibration and equalization in a totally uncoupled way. In this case, the calibration, whose aim is to estimate the differential responses of the reception chains, is through the injection, into the input of these chains, of a calibration signal that may correspond to a sine wave whose frequency varies sequentially on the entire reception band. The measurements made at output of the chains makes it possible to estimate differential errors between chains and build equalizing filters at a second stage.

Before introducing the object of the present invention, a few points may be recalled on prior art methods of equalization.

A. Signals at Output of the Sensors

It is assumed that the array with N sensors (corresponding to radiating elements or preformed sub-arrays) of an antenna processing system receives a noise-ridden mixture of P ($P \leq N$) narrow band (NB) sources. According to these assumptions, the vector $v(t)$ of the complex envelopes of the signals at output of the sensors can be written, at a point in time t as follows:

$$v(t) = \sum_{p=1}^{P} m_p(t) a_p + b(t) \underline{\underline{\Delta}} Am(t) + b(t) \qquad (1)$$

where $b(t)$ is the noise vector, $m_p(t)$ and $a_p$ respectively correspond to the complex vector and to the direction vector of the source p, $m(t)$ is the vector whose components are the values $m_p(t)$ and A is the matrix (N×P) whose columns are the vectors $a_p$.

For any unspecified sensors, the component n of the direction vector $a_p$ is given by $$a_{pn} = f_n(k_p, \eta_p) \exp(-j\, k_p\, r_n) \qquad (2)$$

where $k_p$ and $\eta_p$ are respectively the wave vector and the polarization parameters of the source p, $r_n$ is the position vector of the sensor n and $f_n(k_p, \eta_p)$ is the complex response of the sensor n in the direction of the wave vector $k_p$ for the polarization $\eta_p$.

The techniques of goniometry and certain antenna filtering or anti-interference techniques make implicit or explicit use of the models given by the relationships (1) and (2). However, the model (1) is not directly observable and only the model (described in the following paragraph B) of signals at output of the digitization chains is observable.

B. Signals at Output of the Digitization Chains

The signals at output of the sensors travel through the reception-digitization chains (with frequency responses $T_n(f)$) before they are observed. In a real system, these chains which, it is wished, should resemble each other to the greatest possible extent, generally remain substantially different and, furthermore, fluctuate for example because of temperature or ageing.

If $T_n(t)$ denotes the pulse response of the digitization chain, n the component n of the observation vector, x(t), at output of the digitization chains is written as follows:

$$x_n(t) = \sum_{p=1}^{P} T_n(t) * m_p(t) a_{pn} + T_n(t) * b_n(t) \tag{3}$$

where $b_n(t)$ is the component n of the vector b(t). From the expression (3), we deduce that of the vector, x(t), given by $$x(t) = \sum_{p=1}^{P} T(t) * a_p m_p(t) + T(t) * b(t) \underline{\underline{\Delta}} T(t) * Am(t) + T(t) * b(t) \tag{4}$$

where T(t) is a diagonal matrix (N×N) whose diagonal terms are the quantities $T_n(t)$. In the frequency domain, the model (4) is written as follows:

$$x(f) = \sum_{p=1}^{P} m_p(f) T(f) a_p + T(f) b(f) \underline{\underline{\Delta}} T(f) Am(f) + T(f) b(f) \tag{5}$$

where $m_p(f)$, x(f), T(f) and m(f) are the Fourier transforms respectively of $m_p(t)$, x(t), T(t) and m(t).

Thus, at output of the digitization chains, the direction vector of the source p at the frequency f is no longer $a_p$ but $T(f) a_p$. This vector becomes proportional to $a_p$ only if the matrix T(f) is proportional to the identity, i.e. if the impulse responses $T_n(t)$ are identical for all n. In practice, the chains are different and the vectors $T(f) a_p$ and $a_p$ are not collinear. This causes impairment of the performance of the techniques making explicit use of the relationships (1) and (2) such as goniometry techniques.

C—Equalization of the Reception Chains

In order to overcome the limitations described here above, one of the known methods of the prior art consists of the conversion of the observations x(t) into observations z(t). This is done by invariant linear filtering H(t), where H(t) is the diagonal matrix of the impulse responses $h_n(t)$. These observations z(t) are given by:

$$z(t) = H(t) * x(t) = H(t) * T(t) * A\ m(t) + H(t) * T(t)\ b(t) \tag{6}$$

the Fourier transform of which is:

$$z(f) = H(f)\ x(f) = H(f)\ T(f)\ A\ m(f) + H(f)\ T(f)\ b(f) \tag{7}$$

such that H(f) T(f) becomes a matrix proportional to the identity.

The search for H(f) verifying this property corresponds to the operation of equalization of the reception chains. In practice, the method will seek H(f) such that $H(f)\ T(f) = T_1(f) I$. This consists in choosing the chain 1 as a reference chain and in seeing to it that the other chains resemble the chain 1 as closely as possible after equalization. Thus, the matrix H(f) sought is given by:

$$H(f) = T_1(f)\ T(f)^{-1} \tag{8}$$

This means that the frequency response, $h_n(f)$, of the equalizing filter of the channel n can be written as follows:

$$h_n(f) = T_1(f) / T_n(f) \tag{9}$$

FIG. 3 shows a classically used generic calibration system formed by:

A calibration signal $S_T(t)$ corresponding to a sine wave whose frequency is scanned throughout the digitized band $F_e$ in steps of $\Delta f$ (FIG. 4).

A system 10 for the injection of the calibration signal into the reception-digitization chains 11. Classically, a switch-based system is used. It may be recalled that a reception-digitization chain consists of a certain number of analog elements, referenced by the block ANA in the figure. These are elements such as a frequency transposition chain (based on a synthesizer and local oscillators), one or more power amplifiers, bandpass filters, an anti-aliasing filter, as well as an analog-digital converter (ADC) converting the analog signals into digital signals ready to be processed by a processor. In an antenna processing system, the ADCs of the different channels are synchronized and the totality of these ADCs constitutes the multi-channel sampling system 12. As these different elements are known to those skilled in the art, they shall not be described in detail in the present application.

a system 13 for the processing of the sampled outputs, aimed at estimating the quantities $T_n(f_i)$, $1 \leq i \leq M$, and deducing therefrom the responses $h_n(f_i)$, constituting the frequency correction templates.

The calibration signal shown in FIG. 4 has an adjustable level. It corresponds, for example, to a sine wave whose frequency is scanned by means of a programmable synthesizer, throughout the digitized band in steps of $\Delta f$. The number M of frequency positions in the digitized band $F_e$ is then equal to $M = Ent(F_e/\Delta f)$ where $M = Ent(F_e/\Delta f) + 1$ according to the centering of the sampling in frequency.

In practice, if the spectrum of the sine wave is computed from a duration of observation of this sine wave referenced T, a sine(x) curve with a bandwidth of 3 dB and a duration in the range of 1/T takes the place of the spectral line.

The system for the injection of the calibration signal is aimed especially at replacing the output of the sensors by an equal-phase and equal-amplitude calibration signal at the input of the reception chains. The sensor signal is replaced by the calibration signal and this calibration signal is, in practice, substantially identical on the different channels.

FIG. 5 gives a schematic view of a first device known to those skilled in the art using switches 15i. The replacement of the sensor signals by the calibration signal is done as follows: the switch 15i switches over in such a way that the different channels i are linked to the channel 16 which enables the injection of the calibration signal simultaneously on all the inputs 17i. The simultaneous injection is done for each position of the line.

The performance of this switching is related especially to that of the switch in terms of matching and insulation.

SUMMARY OF THE INVENTION

The present invention relates more particularly to a method based on an uncoupled approach to calibration and equalization.

The invention relates to a device for the calibration and equalization of reception chains of an antenna processing system comprising several RF (radiofrequency) chains, each associated with a radiating element, a set of sensors Ci formed out of the outputs of the preceding RF chains, a channel for the injection of a calibration signal, means to couple the calibration signal to the sensor signals, several reception-digitization chains, wherein the device comprises at least:

a processor adapted to managing all the devices,
a means used to adjust the value of the gain of an RF chain to a minimum value Gmin,
a means for deflecting the sensors, adapted to minimizing their directivity toward interference sources,
a means adapted to adjusting the level of the injected calibration signal ST relative to the signal of the sensors,
an RF chain having a gain adjusted to a minimum value Gmin.

The means of injection of the calibration signal are, for example, couplers ($20i$).

The invention also relates to a method for the calibration and equalization of reception chains of an antenna processing system comprising several RF chains, one per radiating element, several RF chains being associated with a formed sensor Ci, wherein the method comprises at least the following steps:

Injecting a calibration signal $S_T(t)$ at the level of the sensor signals $S_C(t)$,
Setting the value of the gain of the chains RF (18$ij$) to a minimum value of gain Gmin,
Adjusting the injected calibration signal $S_T(t)$ as a function of the level of the signal of the sensors,
Deflecting the sensors Ci in order to minimize their directivity toward the interference sources.

The calibration signal is injected, for example, by means of couplers.

The device according to the invention has the advantage especially of being without switches and of providing a setting strategy that makes it possible to envisage the calibration of the reception channels including in the presence of strong interference received by the sensors of the network.

BRIEF DESCRIPTION OF THE DRAWINGS

Other advantages and features of the present invention shall appear more clearly from the following description, given by way of an illustration that in no way restricts the scope of the invention, and from the appended figures of which.

MORE DETAILED DESCRIPTION

The invention proposes a novel approach, especially in the choice of materials and in the choice of calibration/equalization procedures and also proposes a step of verification after calibration/equalization. Finally, an implementation of an onboard system of this kind on a geostationary satellite from the ground is also developed.

Figure 1:
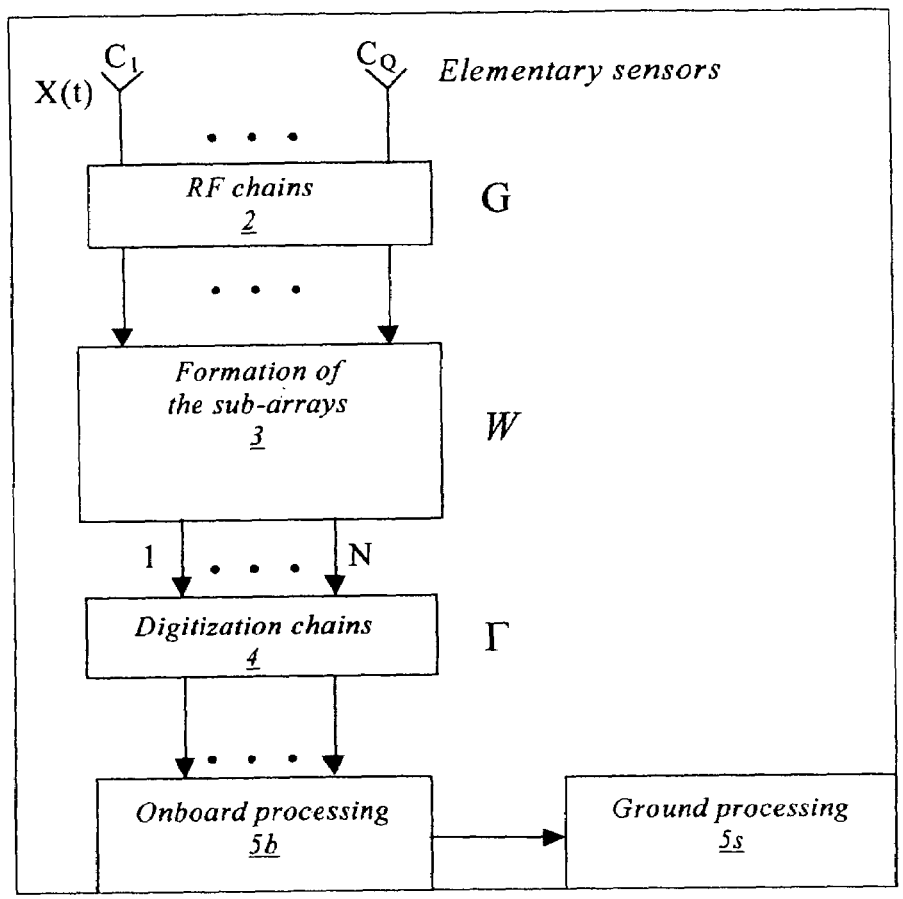
FIG. 1 is a block diagram of a goniometry or anti-interference system.
Figure 2:
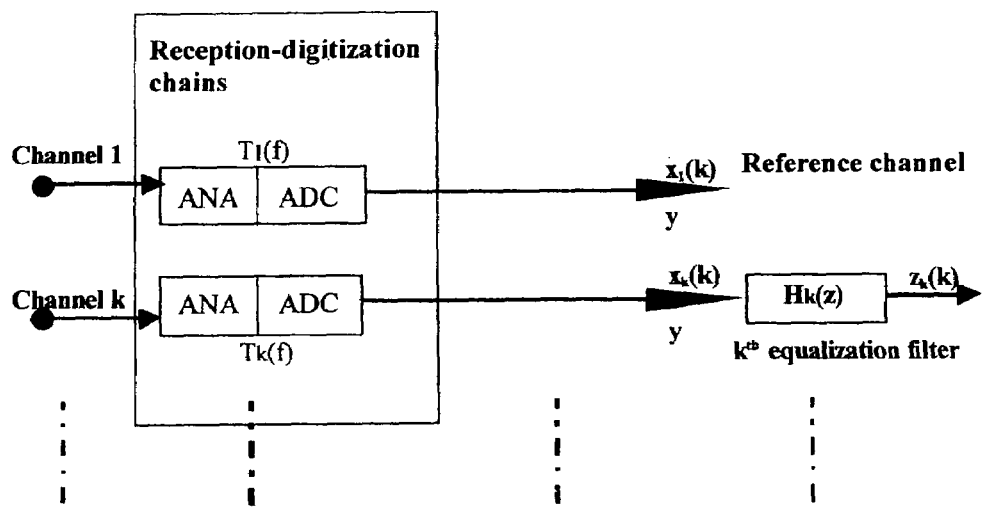
FIG. 2 is a block diagram of the generic operation for the equalization of the reception chains.
Figure 3:
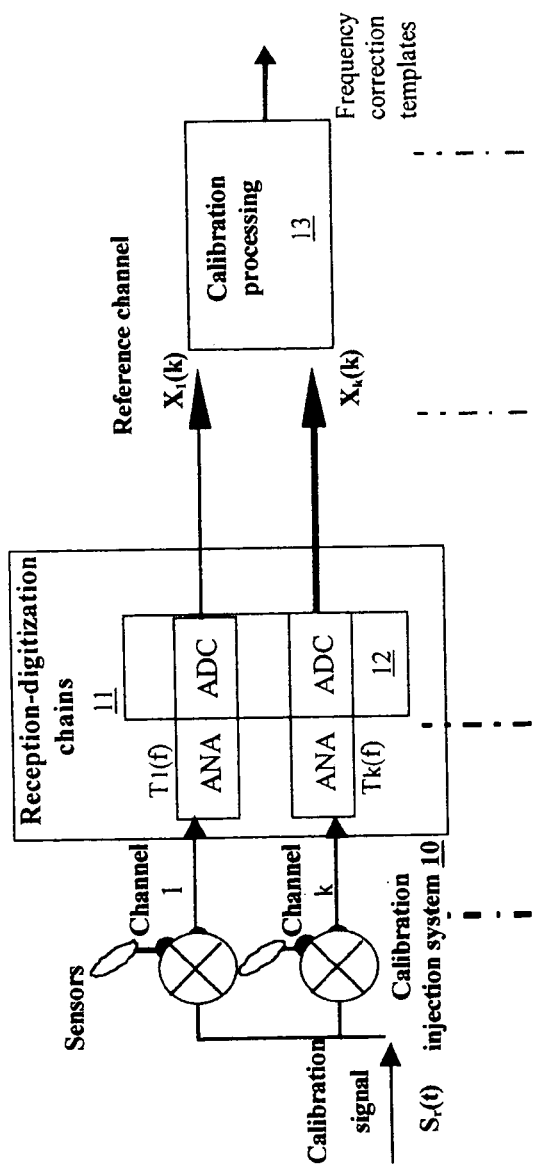
FIG. 3 is a block diagram of the generic operation of a system for the calibration of the reception chains.
Figure 4:
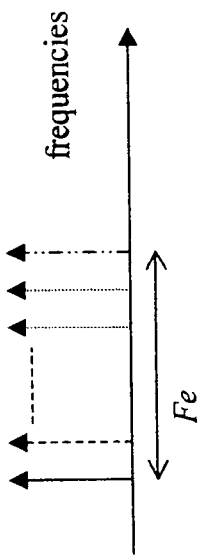
FIG. 4 is a calibration signal.
Figure 5:
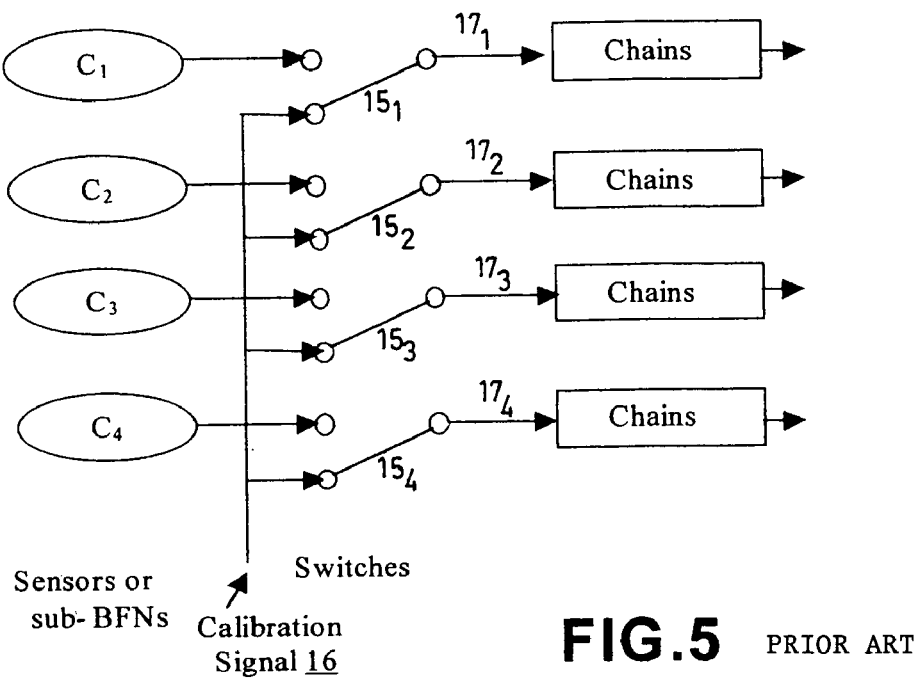
FIG. 5 is a device for the injection of the calibration signal by switching.

The calibration device according to the invention comprises, for example, several couplers $20_1$, $20_2$, $20_3$, $20_4$ working in judiciously chosen conditions. It also comprises various means of adjusting the level of the calibration signal, these means relate to the adjusting the absolute level of the calibration signal, the setting of the RF gains and means of electronically deflecting the antennas. They include a processor positioned, for example, on the ground that will manage the entire unit. The processor is adapted to controlling the aim, the RF gains and the gains of the reception/digitization chains. The deflection can be done mechanically. The elements shown in FIG. 1 are also found in the device although they are not shown in FIG. 6 for the sake of simplification. The gains are set by modifying the gain G and the deflection is done by modifying W at the level of the formation of the sub-arrays. These operations, known to those skilled in the art, shall not be explained in detail in the present patent application.

For the deflection, a law is loaded for example on board and when it has to be loaded, this is done by means of a remote control command from the ground. This is independent of the onboard processing. Similarly, for the setting of the gain, the gain computations are done on the ground and a remote control command sent from the ground enables its value to be set in the satellite. This is independent of the onboard processing.

Figure 6:
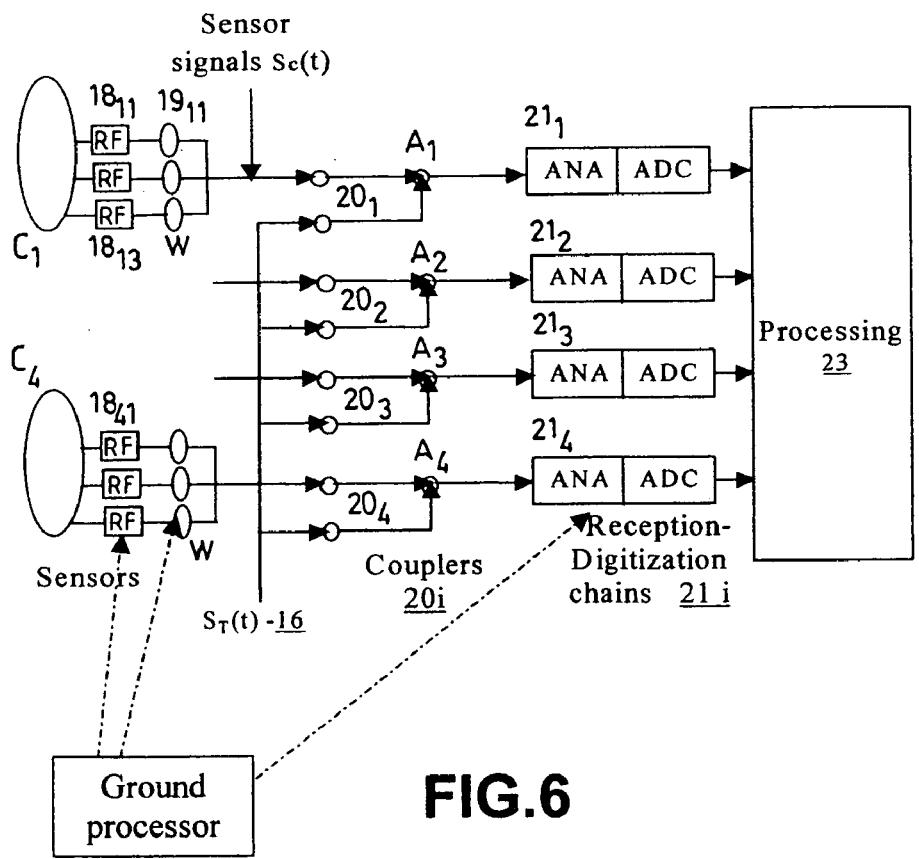
FIG. 6 is a device for the injection of the calibration signal by couplers.

An exemplary embodiment is given in FIG. 6. In this figure, the replacement of the sensor signals $S_C(t)$ by the calibration signals $S_T(t)$ is done by coupling these two signals by means of a coupler 20$i$ at the point Ai in complying with the following condition: obtaining a calibration signal at each of the channels Vi (equal for example to some tens of dB), this signal having a level far higher than that of the sensor signals $S_C(t)$ whatever the environment, whether the disturbances are weak or strong.

The sensors whose outputs are digitized are sensors known as formed sensors or sub-BFNs, formed out of elementary sensors known as radiating elements (ER). This formation makes the sub-BFNs directional and is done by summing the outputs of the radiant elements which are amplified beforehand and filtered by chains known as RF chains (consisting, for example, of low-noise amplifiers and filters) and weighted in phase and amplitude. The reception-digitization chains to be equalized are chains that work in intermediate frequency (IF) after frequency transposition according to methods known to those skilled in the art.

This difference in level between the sensor signals and the calibration signals, the latter having the higher level, is obtained for example:

- by limiting, to the maximum extent, the level of the signals $S_C(t)$ coming from the sensors or sub-BFNs. This limitation can be obtained especially:
  - by adjusting the radio gain of the RF chains 18ij (i is the number of the sub-BFN and j is the number of the radiating element in the sub-BFN. The expression "ij" therefore denotes the radiating element j of the sub-BFN.

upstream from the coupler 20i ($20_1$, $20_2$, $20_3$, $20_4$) at a minimum value $G_{min}$.
  - by deflecting the formed sensors Ci off the earth, for example, in the case of a satellite application, in order to minimize the directivity of these sensors towards interference sources if any,
  - by judiciously adjusting the level of the calibration signal $S_T$ injected by the channel 16 in order to obtain the few tens of dB in terms of difference in level between the calibration signal and the signals coming from the sensors.

The input of the reception-digitization chains 21i thus perceives the calibration signal $S_T(t)$ and the sensor signal $S_C(t)$ coupled.

The method according to the invention comprises a step for adjusting the gains of the RF chains upstream from the couplers under conditions chosen with knowledge that may or may not be a priori knowledge of the environment of the sensor.

Advantageously, this setting strategy makes it possible to envisage the calibration of the reception channels, including in the presence of high level interference received by the sensors of the network.

The following description presents a procedure of calibration and a procedure of equalization followed by an exemplary sequencing of a complete procedure of calibration/equalization/verification.

Method for the Calibration of the Digitization Chains

As mentioned in the introduction presenting the prior art, the procedure for the calibration of the reception chains comprises a step for estimating frequency responses $T_n(f)$ and determining the characteristics of the equalizing filters $H_k(z)$ accordingly.

In the exemplary embodiment, the method operates, for example, in the manner described here below.

The method uses a system for the processing of the sampled outputs reduced to baseband, (the observation vector x(k) ($0 \leq k \leq K-1$), where K to the power of 2 is the number of samples considered per reception chain output). The system is designed and adapted to:

estimating the frequency responses $T_n(f_i)$ reduced to baseband for $1 \leq n \leq N$ (N being the number of sensors) and $1 \leq i \leq M$, (M the number of frequency positions), estimating the frequency responses in baseband $h_n(f_i)=T_1(f_i)/T_n(f_i)$ for $1 \leq n \leq N$ and $1 \leq i \leq M$.

More specifically, for each value of n and for each of the M frequency positions $f_i$, $1 \leq i \leq M$, of the line i in the digitized band, the method estimates the quantity $T_n(f_i)$ reduced to baseband as follows:

Using a Discrete Fourier Transform (DFT)) of the K samples $x_{ni}(k)$ acquired on the channel n for the line i, it computes, for example, the frequency response $X_n(I_i)$ for the discrete channel $I_i$ associated with the line $f_i$:

$$X_n(l_i) = \sum_{k=0}^{K-1} x_{ni}(k) \exp(-j2\pi k l_i / K) \quad (10)$$

where $I_i$ is linked to $f_i$ by the following relationship
If $f_i < F_e/2: I_i = \text{Near}[K\ f_i/F_e]+K/2$ (modulo K)
If $f_i > F_e/2: I_i = \text{Near}[K\ f_i/F_e]K/2$ (modulo K)
where Near(x) corresponds to the integer closest to x.

After having computed the frequency response for the reference channel $X_1(I_i)$ by the procedure described here above, the method determines the estimated value, $\hat{h}_n(I_i)$, of $h_n(f_i)$ reduced to baseband (between $[-F_e/2, F_e/2]$), by $\hat{h}_n(I_i)=X_1(I_i)/X_n(I_i)$.

In fact, $h_n(f_i)=T_1(f_i)/T_n(f_i)$ and $h_n(I_i)$ correspond to $h_n(f_i)$ reduced to baseband in taking account of the working of the DFT by FFT.

At the end of this calibration step, the method has available the following: estimated values, $\hat{h}_n(I_i)$, frequency responses reduced to baseband, characteristics of the equalizer filters relative to the channels 1 to N ($1 \leq n \leq N$) for the frequencies $I_i$, ($1 \leq i \leq M$) of the band $[-F_e/2, F_e/2]$. Let it be written that:

$\hat{h}_1(I_i)=1$ for all the frequencies $I_i$: this means that the samples of the channel 1, namely the reference channel, are not equalized.

The quantities $\hat{h}_n(I_i)$ correspond to the baseband templates of the equalizer filters.

Procedure of Equalization of the Digitization Chains

The equalization procedure is structured, for example, in several steps which shall be presented comprehensively and then in detail.

1. The first step consists in managing the edge effects of the equalizing filters as efficiently as possible; the frequency template $\hat{h}_n(I_i)$ of the equalizing filter is obtained.
2. The second step consists in choosing the number of coefficients, R, to synthesize an FIR equalizer filter whose frequency response most closely approaches the smoothened frequency template coming from the step for the calibration and management of the edge effects. One possible approach for this synthesis corresponds to an approach, for example, by FFT. The filters that result therefrom are, for example interpolator filters which weight both the present and the past.
3. The third step consists, firstly, in filtering the samples $x_{ni}(k)$ coming from the reception channels by the impulse responses of the equalizer filters computed here above (calibration step) and, secondly, in judiciously delaying the samples $x_{1i}(k)$ of the non-equalized reference channel 1, so as to compensate for the phase lead of these samples relative to the equalized samples of the other channels, induced by the operation of non-causal filtering of the channels 2 to N.

1—Management of the Edge Effects

The goal is to equalize the responses from the reception channels within the useful reception band B, which is smaller than the digitization band $F_e$. Now, in practice, the reception channels may have high-amplitude differential responses outside the useful band. This may give rise to the need to consider Finite Impulse Response (FIR) equalizing filters with a large number R of coefficients or it may impair the performance of the equalization within the useful band if the number of coefficients of the FIR equalizing filters is fixed arbitrarily. This is why it is desirable, outside the useful band, to dictate a relatively smoothened frequency response aimed at limiting deterioration within the useful band with a fixed number of coefficients. (The transition band is the portion of the digitization band (with a width $F_e$) that is located outside the useful band. The transition band therefore a band with a width $F_e-B$).

Figure 7:
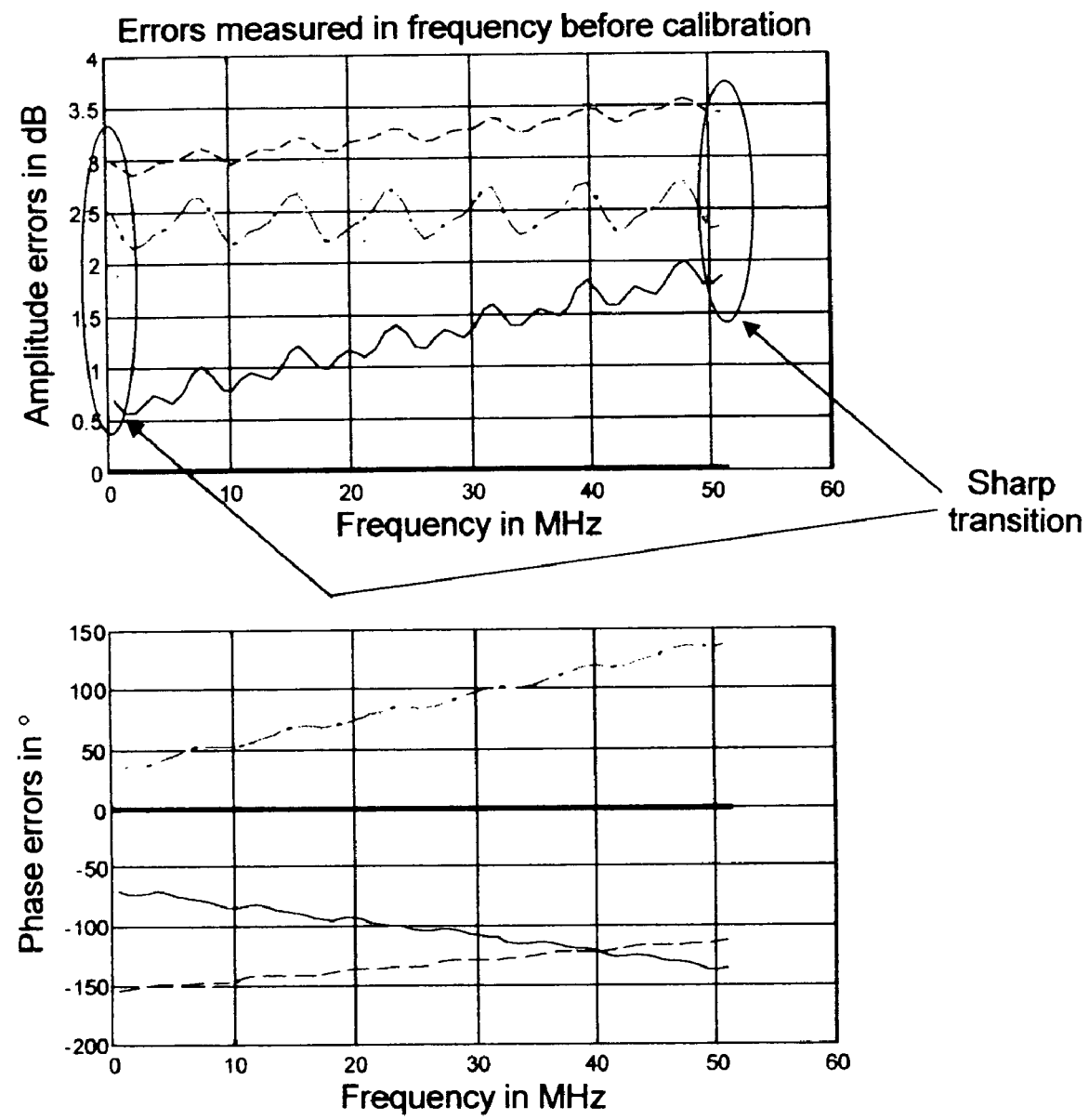
FIG. 7 is an exemplary template of equalizing filters before management of the edge effects.

A method of management of the edge effects is described here below. It is based especially on the following assumptions: the templates in frequency, amplitude and phase of the estimated equalizing filters, determined during the calibration phase have physically no reason whatsoever to show identical values at the two ends of the band being scrutinized, namely for the frequencies $-F_e/2$ and $F_e/2$ for the baseband representation and for the frequencies 0 and $F_e$ for the intermediate frequency representation, inasmuch as the errors to be equalized at the beginning of a band are generally very different from those at the end of a band. To illustrate these statements, FIG. 7 gives a typical example of a reading, by calibration, of the template of the equalizing filters, in amplitude and in phase, between 0 and $F_e$, where the curve (I) (phase=0 and amplitude=0 dB) corresponds to the reference channel 1. The other curves (II), (III), (IV) correspond to the three reception channels.

Since the digital filters have a periodic frequency response, this discontinuity of template values at the band ends are the cause of problems encountered during the operation of synthesis of this template by an FIR filter for which the number of coefficients is laid down. Indeed, the constraint of a limited number of coefficients in conjunction with the discontinuity described here above are causes of distortion of the template to be synthesized in the reception band, and this distortion increases when the number of coefficient imposed decreases. In particular, the band ends (within a certain transition band) all have chances of not being correctly equalized.

In order to alleviate these drawbacks, the method according to the invention operates in the manner described here below.

The central idea is that of forcing the frequency response of the equalizing filters for the measurement points located in a small transition band, at the beginning and end of a band, to arbitrarily determined values, such that the continuity at the band ends is ensured.

The chosen method is, for example, that of linear interpolation in amplitude and in phase on the points of the transition band $B_T$ between the last measurement point of the digitized band $B_N$ with a width Fe and the first measurement point of this band (the first point being seen as that of the digitized band of the next measurement period). This method has the advantage especially of being simpler and of minimizing the amplitude/phase variations, thus releasing a maximum number of coefficients of the filters for the calibration of the useful band.

Figure 8:
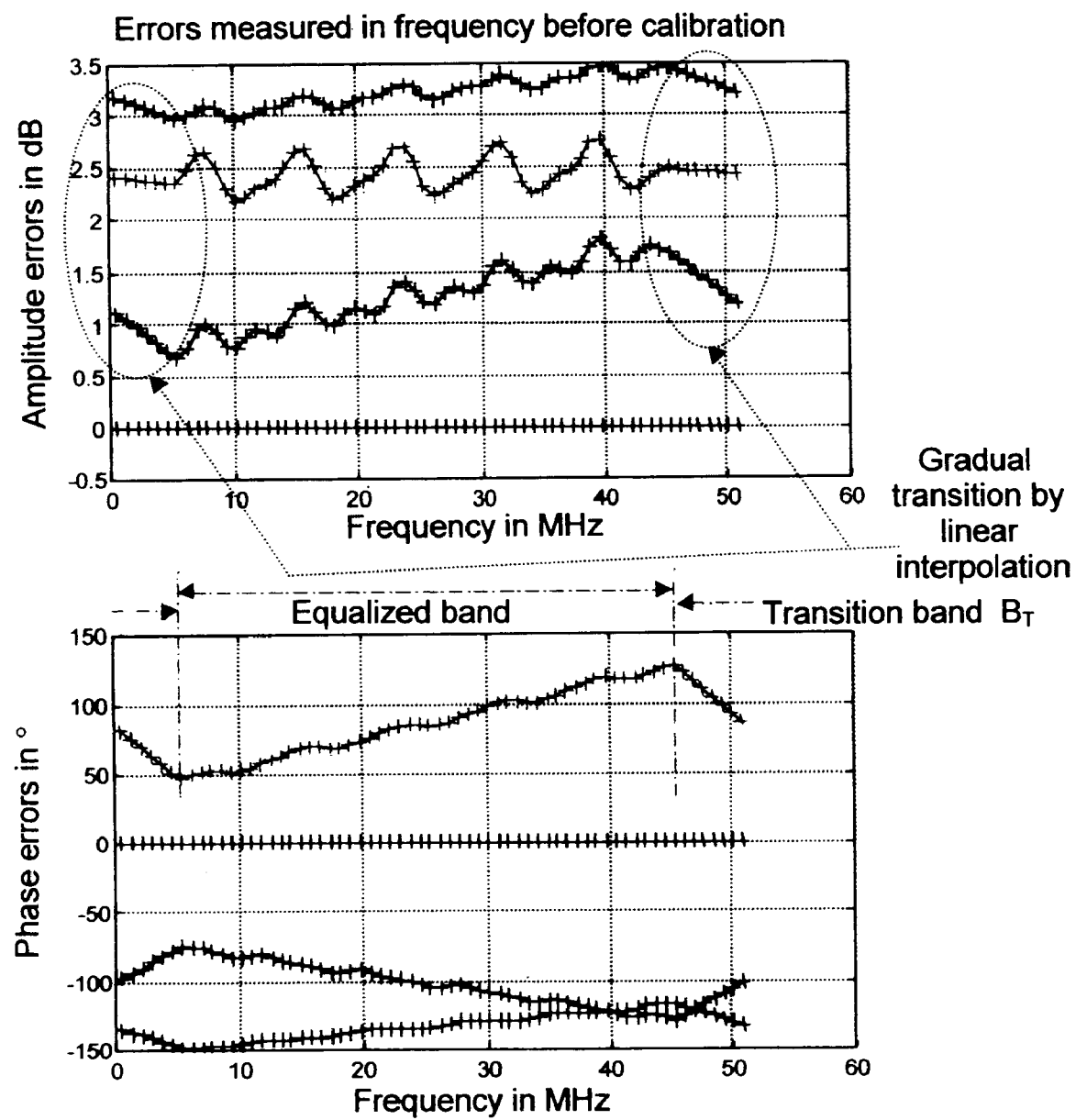
FIG. 8 is an exemplary template of equalizing filters after management of the edge effects.

FIG. 8 illustrates the implementation of this method for the case of the reading of the calibration of FIG. 7.

2—Synthesis of an FIR Equalizing Filter

The method of computation of the equalizing filters by reverse FFT has the advantage of being conceptually simple and of requiring only a strict minimum of computations. It entails the assumption that the value M of the positions of the lines is a power of 2. The idea then consists, for each of the channels n, $2 \leq n \leq N$:

in considering the sequence of the M frequency samples, $\hat{h}_n(I_i)$ $(1 \leq i \leq M)$ to correspond also to the sequence $\hat{h}_n(u_i+\delta) \underline{\Delta} \hat{h}_{n,\delta}(u_i)$ $(1 \leq i \leq M)$ where $u_i=I_i-\delta$ and where $\delta$ corresponds to the value of $I_i$ closest to zero. Thus, zero corresponds to one of the values of $u_i$. Consequently, the time sample No. k, $\hat{h}_{n,\delta}(k)$, of the reverse Discrete Fourier Transform of the sequence of frequency samples $\hat{h}_{n,\delta}(u_i)$ is written as $\hat{h}_{n,\delta}(k)=\exp(-j2\pi\delta k/M)) \hat{h}_n(k)$ where $\hat{h}_n(k)$ is the reverse DFT of the sequence $\hat{h}_n(u_i)$.

computing the reverse Fourier transform, $\hat{h}_n(k)$ $(0 \leq k \leq M-1)$, of the M frequency samples, $\hat{h}_n(u_i)$ $(1 \leq i \leq M)$. To do this:

the sequence $\hat{h}_n(I_i)$, corresponding to a frequency representation between $[-F_e/2, F_e/2]$ is periodized so as to obtain a representation between $[0, F_e]$. The sequence $\hat{h}_n(I_i)'$ is obtained.

the reverse Fourier Transform of the sequence $\hat{h}_n(I_i)'$ is built: this sequence gives the sequence of time samples $\hat{h}_n(k)$ building the sequence $\hat{h}_{n,\delta}(k)=\exp(-j2\pi\delta k/M)) \hat{h}_n(k)$ $(0 \leq k \leq M-1)$, and then a non-causal version of this sequence, in reordering these coefficients. Then, the sequence: $[\hat{h}_{n,\delta}((M-2)/2+1), \ldots, \hat{h}_{n,\delta}((M-1), \hat{h}_{n,\delta}(0), \hat{h}_{n,\delta}(1), \ldots, \hat{h}_{n,\delta}((M-2)/2)]$ is built.

truncating the preceding non-causal sequence to R values, in eliminating the first and last values of the sequence. We then obtain, for $R=2q+1$, a sequence written as $\hat{H}_{n,\delta}=[\hat{h}_{n,\delta}(-q), \ldots, \hat{h}_{n,\delta}(-1), \hat{h}_{n,\delta}(0), \hat{h}_{n,\delta}(1), \ldots, \hat{h}_{n,\delta}(q)]$. This sequence is the sequence of coefficients of the equalizing filter of the channel n.

The frequency template of the equalizing filter n is derived from the calibration and management of the edge effects. It corresponds to $\hat{h}_n(I_i)$. It is precisely from this template that the coefficients of the equalizing filter of the channel n are computed by reverse FFT.

3—Application of the Equalizing Filters

The method works as follows:

For each of the channels n, $2 \leq n \leq N$, (other than the reference channel), the method has available the sequence of the coefficients of the equalizing filter $\hat{H}_{n,\delta}=[\hat{h}_{n,\delta}(-q), \ldots, \hat{h}_{n,\delta}(-1), \hat{h}_{n,\delta}(0), \hat{h}_{n,\delta}(1), \ldots, \hat{h}_{n,\delta}(q)$ as well as that of the samples $x_n(m)$ $(0 \leq m \leq K)$, $K+1 \geq R$, derived from the reception chain n. As a result, the output of the equalizer and that of the channel 1 at the instant k $(0 \leq k \leq K+1-R)$ are written as follows:

$$y_n(k) = \sum_{i=-q}^{q} \hat{h}_{n,\delta}(i) x_n(k-i+q) (2 \leq n \leq N) \quad (11)$$

$$y_1(k) = x_1(k+q) \quad (12)$$

Indeed, so as to be able to compensate for both leads and delays, it must be considered that the output k of the equalizing filters corresponds to the compensated output of the reception chains at the instant $k-\Delta$ where, for reasons of symmetry, $\Delta$ is chosen to be equal to the half length of the filters in number of samples. Thus, the compensation for the sample $x(k-\Delta)$ must be made in taking account of an equal number of samples before and after the instant $k-\Delta$. Thus, the reference channel must follow the same logic, whence the delay to be introduced.

Verification of Calibration/equalizing Operations

According to one alternative embodiment, the method according to the invention comprises a step for the verification of the efficient operation of the procedure of calibration/equalization and of detecting malfunctions in the reception chains. To this end, two approaches may be implemented.

A. Method Not Using the Equalized Samples

For each of the channels, n, $2 \leq n \leq N$, there is the sequence of the coefficients of the equalizing filter $\hat{H}_{n,\delta} = [\hat{h}_{n,\delta}(-q), \ldots, \hat{h}_{n,\delta}(-1), \hat{h}_{n,\delta}(0), \hat{h}_{n,\delta}(1), \ldots, \hat{h}_{n,\delta}(q)]$. In normal operation, the differential errors between chains, before the equalization procedure, have bottom and top limits constituted by values known both in phase and in amplitude. In other words, the following can be written a priori $$A_{min} \leq |\hat{h}_{n,\delta}(i)| \leq A_{max}, -q \leq i \leq q$$

$$\phi_{min} \leq Arg(\hat{h}_{n,\delta}(i)) \leq \phi_{max}, -q \leq i \leq q \quad (14)$$

where $A_{min}$, $A_{max}$, $\phi_{min}$ and $\phi_{max}$ are real values known a priori.

Thus, any crossing of these limits, both the bottom limit and the top limit, may suggest that there is either a malfunction of the calibration/equalization operation or a malfunction of the associated reception channel. This diagnosis will be sustained if there is an index i, $-q \leq i \leq q$, such that:

$$|\hat{h}_{n,\delta}(i)| \leq A_{min} \text{ or } A_{max} \leq |\hat{h}_{n,\delta}(i)| \text{ or }$$

$$\phi_{max} \leq Arg(\hat{h}_{n,\delta}(i)) \text{ or } Arg(\hat{h}_{n,\delta}(i)) \leq \phi_{min} \quad (15)$$

The originality of this approach lies in detecting a malfunction only from the observation of the coefficients of the equalizing filters. It is assumed that the terminals are known a priori.

It must be noted that the same type of reasoning can be made in the frequency domain on the frequency template of the equalizing filters.

B. Method Using the Equalized Samples

From the samples $x_{nj}(k)$ ($0 \leq k \leq K-1$) acquired at output of the reception chain n excited by the line $f_j$, the method builds the outputs $y_{nj}(k)$ of the equalizing filter, associated with the channel n for the excitation considered.

$$y_{nj}(k) = \sum_{i=-q}^{+q} \hat{h}_{n,\delta}(i) x_{nj}(k-i+q) \, (0 \leq k \leq K+1-R) \quad (16)$$

where q corresponds to the number of delayed samples of the channel 1.

As a result, a computation is made of the mean complex error associated with the channel n and with the line j defined by $$e_{nj} = 1/(K-R) \sum_{k=0}^{K+1-R} (y_{nj}(k) - y_{1j}(k)) \, (0 \leq k \leq K+1-R) \quad (17)$$

Thus, a dysfunction of the operation of calibration/equalization of the channel n or a malfunction of this channel is detected if there is at least one line position j such that:

$$E_{max} \leq |e_{nj}| \text{ or } \phi E_{max} \leq Arg(e_{nj}) \quad (18)$$

where $E_{max}$ et $\phi E_{max}$ are thresholds that are decided upon a priori.

The thresholds correspond to the maximum errors that can be tolerated by the localizing function in order to comply with the performance specifications. These thresholds are therefore known a priori following the pre-development phases.

Figure 9:
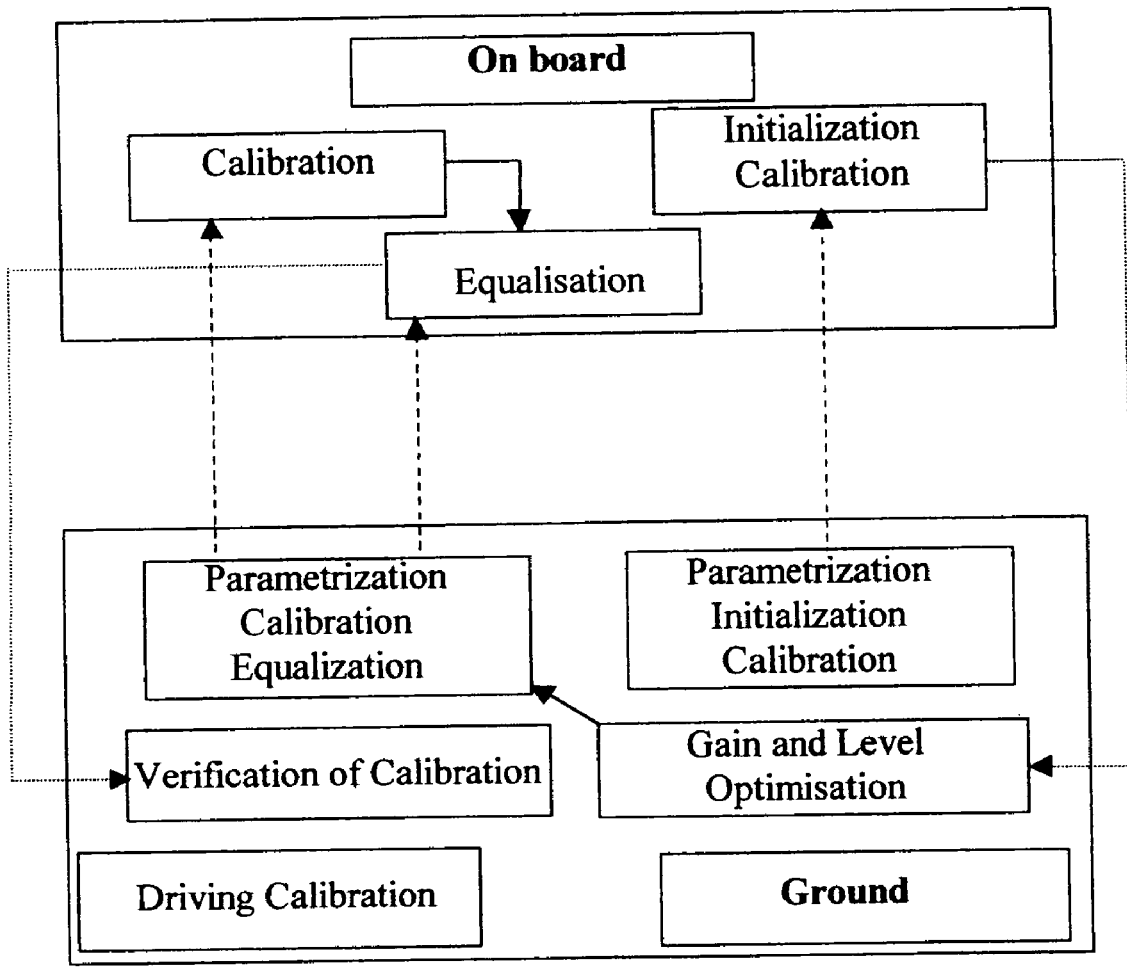
FIG. 9 is an exemplary functional diagram of sequencing of the operations for the implementation of the calibration/verification/verification system according to the invention.

FIG. 9 shows an exemplary complete procedure for the implementation, from the ground, of the calibration/verification/verification procedures described in the above paragraph.

General Sequencing of the Operations

These operations are all remote-controlled from the ground, either automatically or manually by an operator.

The general sequencing of the operations proposed, illustrated in FIG. 9, implements the following functions from the ground and for a given reception band B (digitized band):

Initialization and Calibration: aimed at making a rough assessment of the ambient interference level, on the basis of a scanning operation, on all or part of the earth (the interference units present must be inside the scanned zone), of one or more sub-BFNs constituting the N sensors formed on board the satellite. This function is an onboard function parametrized from the ground by the Parametrization-Calibration-Calibration function.

Gain and Level Optimization: aimed at the optimizing, from the results of the initialization and calibration, firstly of the gain of the reception chains to be calibrated so as to make the utmost use of the dynamic range of encoding of the analog-digital converters of the digitization chains without saturating them and, secondly, the level of the calibration signal. This function is a ground function. The gain mentioned here refers to the gain of the digitization chain FI. Indeed, the gain of the RF chains is, for example, set at the minimum level to receive as few external signals as possible at output of the coupler. The gain FI is the one that will be used by the localization function after the calibration and equalization. It depends on the level of the ambient interference and must prevent the saturation of the localization receivers while, at the same time, enabling the exploitation of the maximum dynamic range at the analog-digital converter. Once these parameters have been fixed, the level of the calibration signal must be such that, during the calibration, the ratio of the calibration signal to the external signals coming from the coupler is sufficient.

Calibration: whose aim is the calibration proper of the reception chains. This function is an onboard function, parametrized from the ground by the parametrization-calibration-equalization function Equalization: whose aim is the construction of the equalization filters associated with the reception channels. This function is an onboard function working on the results of the calibration function and parametrized by the parametrization-calibration-equalization function Verification-Calibration: aimed at verifying the efficiency of the operation of calibration/equalization and/or detection of malfunctions of the reception channels. This function is a ground function parametrized by the parametrization-calibration-equalization function.

The general sequencing of these operations as well as the functions of parametrization of the different calls are controlled by the driving_Calibration function.

Parametrization-initialization-Calibration Function

Upon reception of the request for calibration/equalization by an entity external to the system (operations director, operator etc), the driving Calibration function launches the parametrization-intialization-calibration function whose role is to prepare the parameters needed for the initialization and calibration. These parameters are, for example:

- the identifier of the coverage considered of the satellite,
- the identifier of the frequency channel of the B band to be calibrated,
- the gain of the digitization chain to be used for the calibration initialization. Nominally, this gain is set at its minimum value,
- the list of the identifiers of the weighting values of the sub-BFNs to be used for the production of the measurements of power by the Calibration-Calibration function. These laws are part of the table of the laws loaded on board and are processed sequentially. These laws correspond to amplitude-phase waiting sets enabling beam-formation in a given direction with a minimum of minor lobes in the other directions.

The Calibration-Calibration Function

The Calibration-Calibration function is aimed at making a rough assessment of the ambient interference level on the channel considered from a scanning of the sub-BFNs constituting the N sensors formed on board the satellite. This assessment is made by a mapping on the ground of the power values measured for each aiming of the sub-BFNs scanned.

Figure 10:
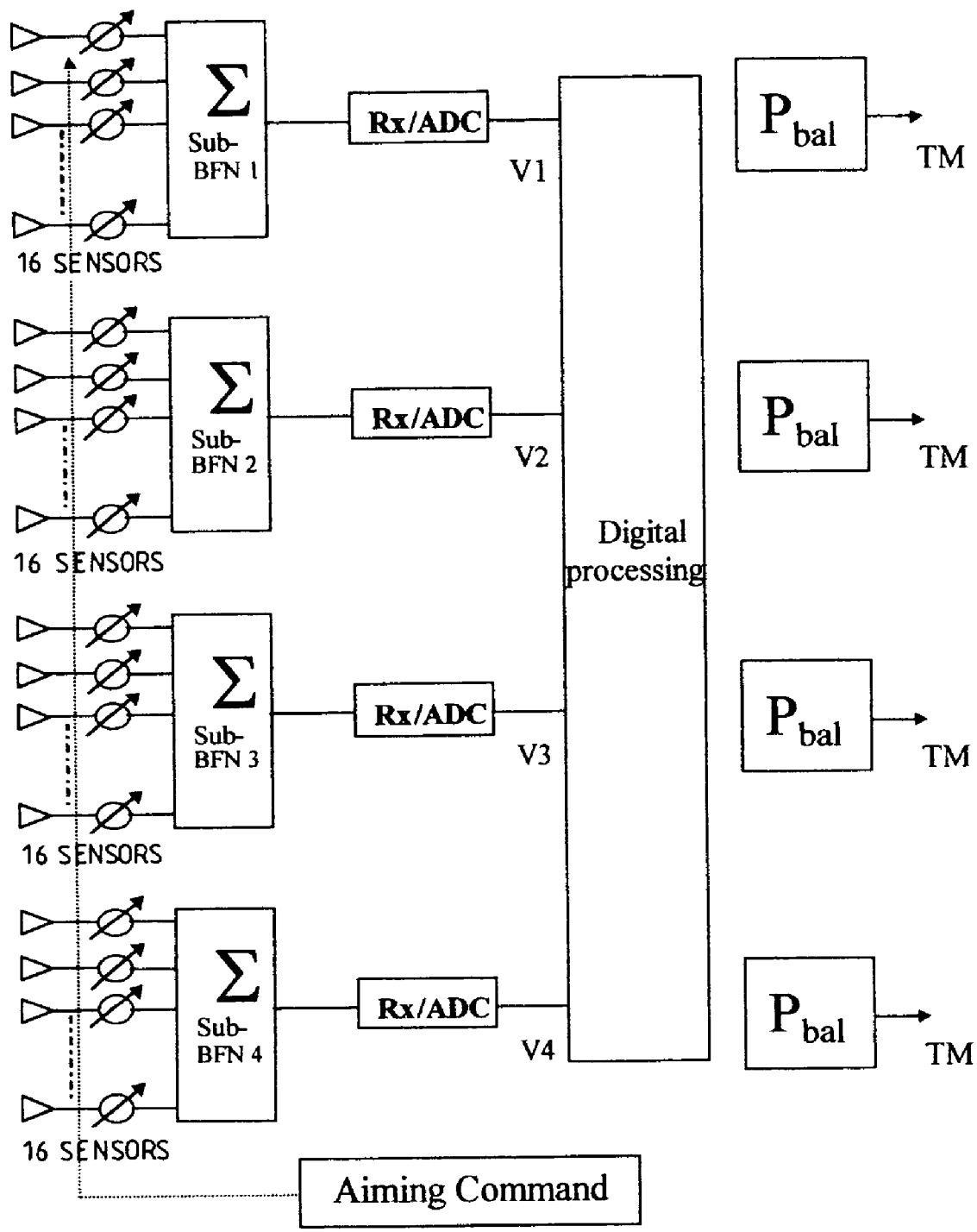
FIG. 10 is a functional diagram of the system for the scanning of the sub-BFNs.

From the parameters derived from the Parametrization-Calibration-Calibration function, the calibration-calibration function implements the following operations:

- setting the gain of the digitization channels,
- making a loop on the aiming of the sub-BFNs contained in the table of laws with, for each aiming operation:
  - applying the law
  - measuring power at output,
  - transferring the measured power to the ground,
  - determining the level of the ambient interference The functional diagram of the scanning system of the sub-BFNs (or sensors) is given in FIG. 10. The power values measured are those associated with the outputs of the sub-BFNs (four in number in the drawing). To accelerate the procedure, the four sub-BFNs may be used simultaneously by scanning different zones. The set of sub-BFN aiming operations constitutes a gridding of the earth as can be seen in FIG. 11.

Figure 11:
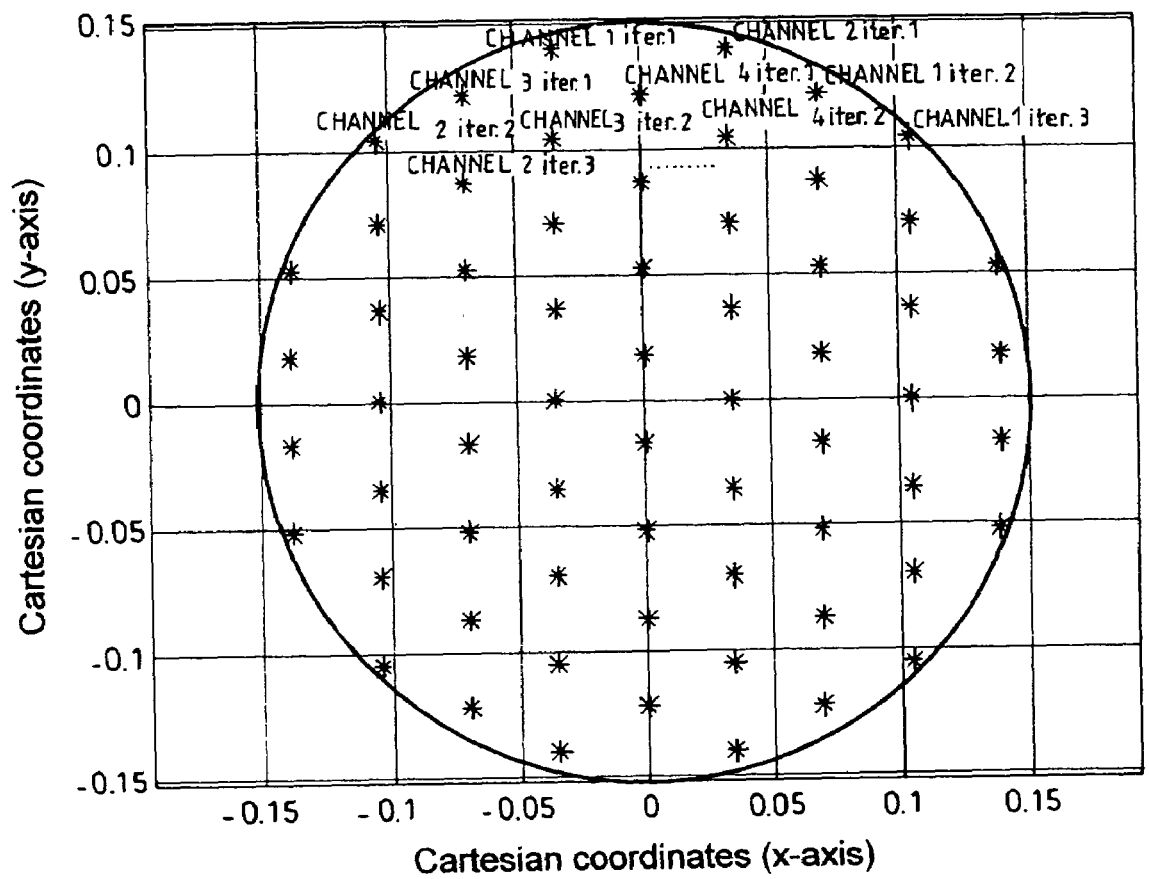
FIG. 11 shows all the directions of aim of the sub-BFNs.

At the end of this procedure, there is a mapping on the ground of the power values measured for the positions of the grid of FIG. 11. The level of the ambient interference (equivalent ground PIRE or equivalent incident flux) is then estimated from the maximum power value listed in the mapping of the power values, propagation losses, characteristics of the sub-BFNs and of the gain of the reception channels.

The Level-Gain Optimization Function

From the results of the Calibration-Calibration function, the Level-Gain Optimization function has the following goals in particular:

- optimizing the gain of the reception-digitization chains to be calibrated in order to exploit the dynamic range of encoding of the ADC as efficiently as possible without saturating these ADCs during the subsequent antenna processing phases (localization, anti-interference etc . . . ). More specifically, this gain is computed from the results of the Calibration-Calibration operation, the initial gain of the reception chains, propagation losses, the responses of the sub-BFNs so that the maximum power observed by the Calibration-Calibration function corresponds to the maximum level of the signal at input of the ADC with a margin related to the imprecision of the measurements,
- optimizing the level of the calibration signal to be injected, from the results of the Initialization-calibration operation and the preceding gain, so as to generate a good signal-to-noise ratio (at least 20 dB for example associated on each of the lines scanned. Furthermore, this setting is also aimed at preventing the injection of an excessively powerful calibration signal (in the absence of interference residue for the device with couplers) which, by crosstalk between reception chains and between sub-BFNs, could disturb the satellite communications channels.

Parametrization-Calibration-Equalization Function

The role of the parametrization-calibration-equalization function is to prepare the parameters needed for the Calibration, Equalization and Verification of Calibration functions. These parameters are for example:

- the identifier of the coverage considered of the satellite,
- the identifier of the B band frequency channel to be calibrated,
- the gain of the digitization chain to be used for the Calibration as well as the level of calibration signal to be injected, both coming from the Level-Gain Optimization function,
- the chosen reference channel number (channel No. 1 in this document)
- the number of coefficients, R, of the FIR equalizing filters,
- the position of the first line, the frequency difference between lines and the number M of lines to be considered for the calibration signal in the band [0, Fe],
- the number of samples K of each line to be considered for the calibration,
- an indicator specifying whether or not the coefficients of the equalizing filters have to be sent to the ground,
- an indicator specifying whether or not the output samples of the equalizing filters have to be sent to the ground,
- the weighting sets of the sub-BFNs enabling a change of aim of sub-BFNs during the calibration for the device with couplers.

Calibration Function

On the basis of the parameters of the parametrization-calibration-equalization function, the calibration function, whose aim is the calibration of the reception chains, namely the learning process for the differential templates (learning process for the differential template between reception channels in order to deduce the templates of the equalizing filters therefrom) of the reception channels, implements the following operations:

- deflection of sub-BFNs off the earth for the proposed device with couplers,
- setting the gain of the reception channels,
- injection of the calibration signal at input of the N channels, by coupling, with a loop on the positions of the lines (the line is scanned on the entire digitized band by $\Delta f$ steps and, for each position, a measurement is made of the differential template of the channels relative to the reference channels). For each line position:
  - computation of the template and of the differential templates of the reception chains by the processing described in paragraph IV The outputs of the calibration function are:
the date and time of the launching of the function, generated by the ground operator,
a calibration report (failure or success), generated for example automatically on board if it had been possible to complete the process,
the differential template of the reception chains (templates of the equalizing filters).

The Equalizing Function

From the parameters of the Parametrization-Calibration-Equalization function and the results of the Calibration function, the equalization function, whose aim is the equalization of the reception chains, namely compensation for the differential responses of the reception channels, implements the following operations:
management of the edge effects (paragraph B),
synthesis of the FIR filter (paragraph C),
equalization of the responses (paragraph D), The output of the Equalization function are:
the date and time of the launching of the function, generated by the ground operator,
the coefficients of the equalizing filters (transmitted to the ground if the Verification-Calibration function has to be activated).

Verification Calibration Function

From the parameters of the Parametrization-Calibration-Equalization function and the results of the Equalization function, the Verification-Calibration function, whose aim is to verify the efficient functioning of the Calibration-Equalization functions and detect malfunctions in the reception chains, implements one of the following two operations or both of them:
Method not using the equalized samples (paragraph A above)
Method using the equalized samples (paragraph B above)
The outputs of the verification calibration function are:
the date and time of the launching of the function;
a report on the efficient functioning or malfunctioning of the Calibration/Equalization functions;
in the event of malfunctioning, the number of the defective channel.

What is claimed is:

1. A device for the calibration and equalization of reception chains of an antenna processing system, comprising:
a radiating element having several RF (radiofrequency) chains, each associated therewith;
a set of sensors Ci formed out of the outputs of the RF chains;
a channel for the injection of a calibration signal; and
means to couple the calibration signal to the sensor signals and several reception-digitization chains:
a processor adapted to manage all the devices;
a means used to adjust the value of the gain of an RF chain to a minimum value Gmin;
a means for deflecting the sensors, adapted to minimizing the sensors directivity toward the interference sources;
a means adapted to adjusting the level of the injected calibration signal relative to the signal of the sensors; and
an RF chain having a gain adjusted to a minimum value Gmin.

2. The device according to claim 1, wherein the means of injection of the calibration signal are, for example, couplers.

3. The method of the calibrating and equalizing of reception chains of an antenna processing system comprising several RF chains, one per radiating element, several RF chains being associated with a formed sensor Ci, comprising the following steps:
injecting a calibration signal ST(t) at the level of the sensor signals $S_C(t)$;
setting the value of the gain of the chains RF to a minimum value of gain Gmin;
adjusting the injected calibration signal $S_T(t)$ as a function of the level of the signal of the sensors; and
deflecting the sensors Ci in order to minimize their directivity toward the interference sources.

4. The method according to claim 3, wherein the signal is injected by means of couplers.

5. The method of calibration according to claim 3 wherein, for each value of sensors n and for each of the M frequency positions $f_i$, $1 \leq i \leq M$ of the line i in the digitized band, an estimation is made of the quantity $T_n(t_i)$ reduced to baseband by the computation, using a Discrete Fourier Transform (DFT) of the K samples $x_{ni}(k)$ acquired on the channel n for the line i, of the frequency response $X_n(l_i)$ for the discrete channel $l_i$ associated with the line $f_i$:

$$X_n(l_i) = \sum_{k=0}^{K-1} x_{ni}(k) \exp(-j2\pi k l_i / K) \qquad (10)$$

where $l_i$ is linked to $f_i$ by the following relationship
If $f_i < F_e/2 : l_i = \text{Near}[K\ f_i/F_e] + K/2$ (modulo K)
If $f_i \geq F_e/2 : l_i = \text{Near}[K\ f_i/F_e] - K/2$ (modulo K)
where Near(x) corresponds to the integer closest to x.

6. The method of calibration according to claim 5, wherein said method of calibration determines the reference channel $X_1(l_i)$ and the estimated value, $\hat{h}_n(l_i)$, of $h_n(f_i)$ reduced to baseband (between $[-F_e/2, F_e/2]$), by $\hat{h}_n(l_i) = X_l(l_i)/X_n(l_i)$.

7. The method of calibration according to claim 6 comprising a step in which the frequency response of the equalizing filters is dictated for the measurement points located in a small transition band, located on at least one of the two ends of the digitized bands, by linear interpolation on the points of the transition band between the last measurement point of the digitized band with a width Fe and the first measurement point of this digitized band.

8. The method according to claim 7, comprising a step for synthesizing an FIR filter as follows:
the sequence of the M frequency samples, $\hat{h}_n(l_i)$ ($1 \leq i \leq M$) corresponds also to the sequence $\hat{h}_n(u_i\square) \stackrel{D}{=} \hat{h}_{n,\square}(u_i)$ ($1 \leq i \leq M$) where $u_i = l_i \bar{\square}$ and where $\square$ corresponds to the value of $l_i$ closest to zero which thus corresponds to one of the values of $u_i$,
the reverse Fourier transform, $\hat{h}_n(k)$ ($0 \leq k \leq M-1$), of the M frequency samples, $\hat{h}_n(u_i)$ ($1 \leq i \leq M$) is computed and, to do this:
the sequence $\hat{h}_n(l_i)$, corresponding to a frequency representation between $[F_e/2, F_e/2]$ is periodized so as to obtain a representation between $[0, F_e]$, the sequence $\hat{h}_n(l_i)'$ being obtained;
the reverse Fourier Transform of the sequence $\hat{h}_n(l_i)'$ is built, the reverse Fourier Transform sequence giving the sequence of time samples $\hat{h}_n(k)$:
the sequence $\hat{h}_{n,\square}(k) = \exp(j2\square\square k/M)) \hat{h}_n(k)$ ($0 \leq k \leq M-1$), and then a non-causal version of this sequence are built, in reordering these coefficients, and then the sequence: $[\hat{h}_{n,\square}((M-2)/2+1), \ldots, \hat{h}_{n,\square}(M-1), \hat{h}_{n,\square}(0), \hat{h}_{n,\square}(1), \ldots, \hat{h}_{n,\square}((M-1)/2)]$ is built;

the preceding non-causal sequence is truncated to R values, in eliminating the first and last values of the sequence and then, , for R=2q+1, there is obtained a sequence written as $\hat{H}_{n,\square}=[\hat{h}_{n,\square}(-q), \ldots, \hat{h}_{n,\square}(-1), \hat{h}_{n,\square}(0), \hat{h}_{n,\square}(1), \ldots, \hat{h}_{n,\square}(q)]$, the preceding non-casual sequence corresponding to the sequence of coefficients of the equalizing filter of the channel n.

9. The method according to claim 8, comprising a step of:
   filtering the samples $x_{ni}(k)$ coming from the reception channels by the impulse responses of the previously computed equalizing filters,
   delaying the samples $x_{ji}(k)$ of the reference channel 1, which is not equalized, so as to compensate for the phase lead of these samples relative to the equalized samples of the other channels, induced by the non-causal filtering operation for the channels 2 to N.

10. The method of calibration and of equalization according to claim 3 comprising a step for the detection of malfunctions in which each coefficient of the equalizing filter is compared with a threshold value.

11. The method of calibration and of equalization according to claim 3 comprising a malfunction detection step in which:
   from the samples $x_{nj}(k)$ ($0 \leq k \leq K^{-1}$) acquired at output of the reception chain n excited by the line $f_j$, the method builds the outputs $y_{nj}(k)$ of the equalizing filter, associated with the channel n for the excitation considered $$y_{nj}(k) = \sum_{i=-q}^{+q} \hat{h}_{n,\delta}(i) x_{nj}(k-i+q) (0 \leq k \leq K+1-R) \quad (16)$$

where q corresponds to the number of delayed samples of the channel 1;
a computation is made of the mean complex error associated with the channel n and with the line j defined by $$e_{nj} = 1/(K-R) \sum_{k=0}^{K+1-R} (y_{nj}(k) - y_{1j}(k)) \quad (0 \leq k \leq K+1-R) \quad (17)$$

if there exists at least one line position j such that:

$$E_{max} \leq |e_{nj}| \text{ or } \square\square_{max} \leq Arg(e_{nj}) \quad (18)$$

where $E_{max}$ et $\square\square_{max}$ are thresholds that are decided upon a priori, then a malfunction is detected.

12. The use of a device for the calibrator and equalization of reception chains of an antenna processing system according to claim 1 for the calibration and equalization of sensors on board a satellite.

13. The method of calibration according to claim 4 wherein, for each value of sensors n and for each of the M frequency positions $f_i$, $1 \leq i \leq M$, of the line i in the digitized band, an estimation is made of the quantity $T_n(f_i)$ reduced to baseband by the computation, using a Discrete Fourier Transform (DFT) of the K samples $x_{ni}(k)$ acquired on the channel n for the line i, of the frequency response $X_n(l_i)$ for the discrete channel $l_i$ associated with the line $f_i$:

$$X_n(l_i) = \sum_{k=0}^{K-1} x_{ni}(k) \exp(-j2\pi k l_i/K) \quad (10)$$

where $l_i$ is linked to $f_i$ by the following relationship
If $f_i < F_e/2 : l_i = \text{Near}[k \ f_i/F_e] + K/2$ (modulo K)
If $f_i \geq F_e/2 : l_i = \text{Near}[K \ f_i/F_e] - K/2$ (modulo K)
where Near(x) corresponds to the integer closest to x.

14. The use of a method for the calibrator and equalization of reception chains of an antenna processing system according to claim 3 for the calibration and equalization of sensors on board a satellite.

* * * * *